United States Patent
Sawada et al.

(10) Patent No.: US 7,083,857 B2
(45) Date of Patent: Aug. 1, 2006

(54) FIRE-PROTECTION GLASS PRODUCT WITH HEAT SHIELDING CHARACTERISTIC AND METHOD FOR USING THE SAME

(75) Inventors: Masahiro Sawada, Hikone (JP); Yoshio Hashibe, Shiga (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 10/371,818

(22) Filed: Feb. 21, 2003

(65) Prior Publication Data

US 2003/0157339 A1    Aug. 21, 2003

(30) Foreign Application Priority Data

Feb. 21, 2002 (JP) .............................. 2002-044292
Sep. 24, 2002 (JP) .............................. 2002-277890

(51) Int. Cl.
*B32B 17/06* (2006.01)
(52) U.S. Cl. ...................... 428/432; 428/428; 428/699; 428/701; 428/702; 428/920; 428/921
(58) Field of Classification Search ............ 428/34, 428/410, 428, 432, 689, 69, 698, 699, 701, 428/702, 704, 920, 921
See application file for complete search history.

(56) References Cited

U.S. PATENT DOCUMENTS

| 4,173,668 A | * | 11/1979 | Hentzelt et al. | ............... 428/34 |
| 4,268,581 A | * | 5/1981 | De Boel | ............... 428/428 |
| 4,581,280 A | * | 4/1986 | Taguchi et al. | ............. 428/212 |
| 4,910,074 A | * | 3/1990 | Fukawa et al. | ............. 428/215 |
| 5,624,760 A | * | 4/1997 | Collins et al. | ............... 428/426 |
| 6,335,479 B1 | * | 1/2002 | Yamada et al. | ............. 428/426 |

FOREIGN PATENT DOCUMENTS

| GB | 0 389 291 A1 | * | 9/1990 |
| GB | 2 281 746 A | * | 3/1995 |
| JP | 60-246508 | | 12/1985 |
| JP | 05-058681 | | 3/1993 |
| JP | 5238782 | | 9/1993 |
| JP | 8040747 | | 2/1996 |
| JP | 1 088 651 A2 | * | 4/2001 |
| JP | 1088651 | | 4/2001 |
| JP | 2002128542 | | 5/2002 |
| JP | 2002-128542 | * | 5/2005 |

* cited by examiner

*Primary Examiner*—Jennifer McNeil
*Assistant Examiner*—G. Blackwell
(74) *Attorney, Agent, or Firm*—Collard & Roe, P.C.

(57) ABSTRACT

A fire-protection glass product having a heat shielding characteristic comprises a fireproof glass plate, a heat ray reflection film formed on one or both of opposite surfaces of the fireproof glass plate, and an oxidation prevention film formed on the heat ray reflection film.

11 Claims, 3 Drawing Sheets

FIRE-PROTECTION GLASS PRODUCT WITH HEAT SHIELDING CHARACTERISTIC AND METHOD FOR USING THE SAME

BACKGROUND OF THE INVENTION

This invention broadly relates to a fire-protection glass product which has a heat shielding characteristic and which is used so as to secure a safe escape route upon occurrence of fire and to prevent spread of fire towards an adjacent room.

As a product called a fire-protection glass, a wire glass, a tempered glass, and a crystallized glass are known and already commercially available. Such fire-protection glass has a heat resistance and not only can shield flames and smokes upon occurrence of fire but also serves as a window for securing an inside view. However, the above-mentioned fire-protection glass almost entirely transmits heat rays. This makes it difficult to secure a safe escape route and causes the spread of fire towards a next adjacent room.

In order to solve the above-mentioned problems, proposal has been made of a fire-protection glass product 12 illustrated in FIG. 1. Specifically, the fire-protection glass product 12 has a multilayer structure comprising two glass plates 10 with a gel layer 11 interposed therebetween. For example, such fire-protection glass product is disclosed in Japanese Unexamined Patent Publication No. Hei. 5-238782. The fire-protection glass product 12 has a heat shielding characteristic because, upon occurrence of fire, the gel layer 5 foams, i.e., produces bubbles to become clouded so that the heat rays can not be transmitted through the fire-protection glass product 12. In addition, the fire-protection glass product 12 has a heat insulating characteristic because an air layer is formed by the above-mentioned foaming.

Proposal has also been made of a fire-protection glass product 15 illustrated in FIG. 2. The fire-protection glass product 15 having a heat shielding characteristic comprises two glass plates 10 laminated via an intermediate resin layer 13 interposed therebetween with a heat ray reflection film 14 formed on one of the glass plates 10. For example, the fire-protection glass product 15 is disclosed in Japanese Unexamined Patent Publication No. 2001-97747.

The fire-protection glass product 15 utilizes infrared ray reflection function of carrier electrons of the heat ray reflection film 14 as well as infrared ray absorption function achieved by carbonization of the intermediate resin layer 13. Specifically, when an atmospheric temperature reaches a range between 800 and 900° C. upon occurrence of fire, the heat ray reflection film 14 is oxidized to reduce the carrier electrons and, therefore, can not sufficiently reflect the heat rays. So as to compensate such insufficient reflection by the heat ray reflection film 14, the intermediate resin layer 13 is carbonized following the temperature rise to absorb the heat rays. Thus, the transmission of the heat rays can be avoided.

However, the above-mentioned fire-protection glass product 12 having the gel layer 11 is high in material cost and heavy in weight so that the installation is difficult. In the fire-protection glass product 12 having the gel layer 11, the gel layer 11 becomes opaque in several minutes upon occurrence of fire. It is therefore difficult to monitor the condition of fire so that life saving and fire fighting are prevented or inhibited.

On the other hand, the fire-protection glass product 15 having the above-mentioned laminated glass structure and the heat ray reflection film 14 is high in material cost because of the laminated glass structure. Further, the intermediate resin layer 12 starts to be carbonized by heat in about 15 minutes upon occurrence of fire. As a consequence, it is difficult to monitor the condition of fire. This prevents life saving and fire fighting.

SUMMARY OF THE INVENTION

It is therefore an object of this invention to provide a fire-protection glass product having a fire-protection characteristic which is light in weight so as to easily be installed, which is low in material cost, and which has a stable heat shielding characteristic for a long time upon occurrence of fire without losing visibility.

The present inventors have found out that the above-mentioned object can be achieved by coating a heat ray reflection film with an oxidation prevention film, and thereby, this invention has been made.

According to a first aspect of the present invention, there is provided a fire-protection glass product having a heat shielding characteristic, comprising:

a fireproof glass plate;

a heat ray reflection film formed on at least one of opposite surfaces of the fireproof glass plate; and an oxidation prevention film formed on the heat ray reflection film.

According to a second aspect of this invention, there is provided a fire-protection glass product having a heat shielding characteristic, wherein:

the heat gain is 1.0 W/cm$^2$ or less and the average transmittance for visible rays having a wavelength between 400 and 700 nm is 60% or more after one surface of the glass product is heated for 30 minutes in accordance with the ISO834 standard heat curve.

According to a third aspect of this invention, there is provided a fire-protection glass product having a heat shielding characteristic, wherein:

after the glass product is heated for 30 minutes at 800° C., an average transmittance for infrared rays having a wavelength between 1500 and 2500 nm is 10% or less while an average transmittance for visible rays having a wavelength between 400 and 700 nm is 60% or more.

According to a fourth aspect of this invention, there is provided a method of using a fire-protection glass product having a heat shielding characteristic and comprising a fireproof glass plate with at least a heat ray reflection film and an oxidation prevention film formed on one surface thereof as a film-deposited or film-coated surface; wherein:

the glass product is used so that the film-deposited surface is placed outside of a protection area to be protected.

In the fire-protection glass product having a heat shielding characteristic according to this invention, the fireproof glass plate preferably comprises a strengthened glass, a borosilicate glass, or a crystallized glass. In particular, the fireproof glass plate is advantageously made of a heat-resistant transparent crystallized glass having an average thermal expansion coefficient between $-10 \times 10^{-7}$/° C. and $+20 \times 10^{-7}$/° C. in a temperature range between 30 and 750° C. because a high heat resistance as well as an excellent fireproof characteristic can be obtained.

As such a heat-resistant transparent crystallized glass, use may be made of a $Li_2O$—$Al_2O_3$—$SiO_2$ crystallized glass which has a composition defined by 3–5% $Li_2O$, 20–30% $Al_2O_3$, 55–70% $SiO_2$, 1–3% $TiO_2$, 1–4% $ZrO_2$, 1–5% $P_2O_5$, 0–4% $Na_2O$, 0–4% $K_2O$, 0.5–4% $Na_2O+K_2O$ by weight % and which contains β-quarts solid solution precipitated therein. The heat-resistant transparent crystallized glass has an average thermal expansion coefficient between $-10\times10^{-7}/°$ C. and $+15\times10^{-7}/°$ C. in a temperature range between 30 and 750° C., i.e., a value nearly equal to zero. Therefore, the heat-resistant transparent crystallized glass is not broken or destroyed by heat of the fire or rapid cooling due to spraying water in fire fighting. In addition, even under a high temperature at which a commonly-used window glass plate is softened and deformed, the heat-resistant transparent crystallized glass is not softened and deformed. Thus, the heat-resistant transparent crystallized glass is not damaged or deformed by heat reaching a temperature of 800° C. upon occurrence of fire, and is superior in function of shielding flames and smokes.

In the fire-protection glass product having a heat shielding characteristic according to this invention, it is preferable that an average reflectance for infrared rays having a wavelength between 1500 nm and 2500 nm is 70% or more while an average transmittance for visible rays having a wavelength between 400 nm and 700 nm is 60% or more. Under the above-mentioned condition, the fire-protection glass product can sufficiently reflect the heat rays, is superior in heat shielding characteristic, and is excellent in visibility. Therefore, the fire-protection glass can suitably and advantageously be used as a window member.

In the fire-protection glass product having a heat shielding characteristic, according to this invention, the heat ray reflection film is preferably made of indium tin oxide (ITO). In this event, the heat rays having a wavelength between 1500 nm and 2500 nm can efficiently be reflected because the ITO film includes a large number of carrier electrons which reflect the heat rays. Consequently, the fire-protection glass product is superior in heat shielding function and is difficult to decrease in average transmittance for the visible rays.

The heat ray reflection film preferably has a film thickness between 1000 Å and 15000 Å, more preferably, between 3000 Å and 8000 Å. If the film thickness is thinner than 1000 Å, the infrared rays having a wavelength between 1500 nm and 2500 nm can not sufficiently be reflected and, therefore, the heat shielding characteristic becomes insufficient. On the other hand, if the film thickness is thicker than 15000 Å, the visible rays can not readily be transmitted and, therefore, the fire-protection glass product is inappropriate for use as the window member.

It is noted here that the heat ray reflection film can be formed on one or both of opposite surfaces of the glass plate by the use of a known process such as sputtering, vapor deposition, spraying, and dipping.

In the fire-protection glass product having a heat shielding characteristic according to this invention, it is preferable that the oxidation prevention film is a transparent oxide film or a transparent nitride film. In this event, the film is dense and low in oxygen transmittance, and is superior in function of protecting the heat ray reflection film. Further, the film is not melted even under a high temperature of 800° C. upon occurrence of fire. In addition, the film is continuously kept dense because phase transition or crystallization hardly occurs. Specifically, the oxidation prevention film is preferably made of silicon oxide, silicon nitride, aluminum oxide, or tin oxide. In particular, silicon oxide or silicon nitride is low in index of refraction and in reflectance for visible rays so that transmittance for the visible rays can be increased. Considering reduction of reflection of the ITO film, silicon oxide is most preferable. From the viewpoint of a chemical durability, silicon nitride is most preferable.

The oxidation prevention film preferably has a film thickness between 100 Å and 5000 Å, more preferably, between 500 Å and 3000 Å. If the film thickness is thinner than 100 Å, oxygen is readily transmitted and, therefore, the heat ray reflection film is easily oxidized when heated. In this event, infrared rays having a wavelength between 1500 nm and 2500 nm can not sufficiently be reflected so that the heat shielding characteristic is insufficient. On the other hand, if the film thickness is thicker than 5000 Å, not only a deposition cost becomes high but also clacks readily occur. Moreover, visible rays having a wavelength between 400 nm and 700 nm can not easily be transmitted so that the use as a window member is difficult.

The oxidation prevention film can be formed to cover the heat ray reflection film by the use of a known process such as sputtering, vapor deposition, spraying, and dipping. In particular, the sputtering is preferable because a dense film can be deposited.

In the fire-protection product comprising the heat ray reflection film and the oxidation prevention film, adhesion between the heat ray reflection film and the oxidation prevention film may be insufficient depending upon the deposition process. In this event, the oxidation prevention film is readily peeled off. Taking this into account, an intermediate film may be formed between the heat ray reflection film and the oxidation prevention film. With this structure, the adhesion between the heat ray reflection film and the oxidation prevention film is improved so that the oxidation prevention film is not readily peeled off or removed.

The intermediate film is preferably made of metal oxide such as titanium oxide, zirconium oxide, and aluminum oxide. In this case, it is possible to enhance the effect of preventing the oxidation prevention film from being peeled off or removed. The intermediate film preferably has a film thickness between 20 Å and 200 Å. If the film thickness is thinner than 20 Å, the effect of preventing the oxidation prevention film from being peeled off is decreased. On the other hand, if the film thickness is thicker than 200 Å, the deposition cost becomes high and the average transmittance for the visible rays tends to be lowered.

In the fire-protection glass product having a heat shielding characteristic and having the above-mentioned features according to this invention, the heat ray reflection film is formed on one or both of the opposite surfaces of the fireproof glass plate and the oxidation prevention film is formed on the heat ray reflection film. With this structure, the fire-protection glass product has a fire-protection characteristic, is light in weight so as to easily be installed, is low in material cost, and has a stable heat shielding characteristic for a long time upon occurrence of fire without losing visibility. Specifically, since the oxidation prevention film is formed on the heat ray reflection film, it is possible to prevent the heat ray reflection film from being oxidized by heating in the air, in other words, to prevent reduction of carrier electrons reflecting infrared rays. As a result, it is possible to maintain a stable heat shielding characteristic for a long time. More specifically, the fire-protection glass product according to this invention has excellent characteristics as follows. For infrared rays having a wavelength between 1500 nm and 2500 nm, an average reflectance is 70% or more or an average transmittance is 10% or less. For visible rays having a wavelength between 400 nm and 700 nm, an average transmittance is 60% or more. Further, even if one surface of the glass product is heated for 60 minutes in accordance with the ISO834 standard heat curve, an average reflectance for infrared rays having a wavelength between 1500 nm and 2500 nm can be kept at 35% or more while an average transmittance for visible rays having a wavelength between 400 nm and 700 nm can be kept at 60% or more. Alternatively, even if one surface of the glass product is heated for 30 minutes at 800° C., an average transmittance for infrared rays having a wavelength between 1500 nm and 2500 nm can be kept at 10% or less while an average transmittance for visible rays can be kept at 60% or more.

Now, embodiments of this invention will be described in detail with reference to the drawing.

DESCRIPTION OF THE PREFERRED EMBODIMENTS

Figure 1:
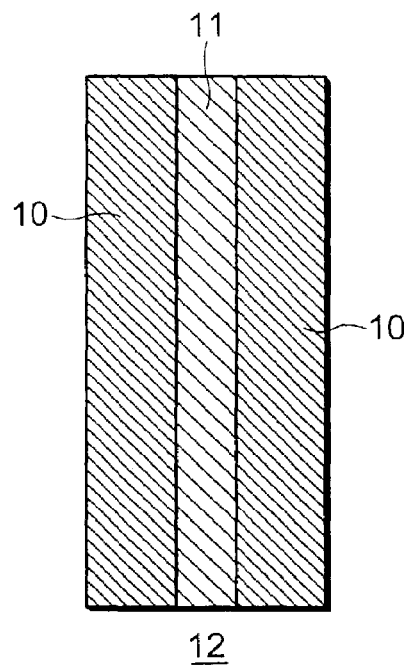
FIG. 1 is a sectional view for explaining a conventional fire-protection glass product having a gel layer.
Figure 2:
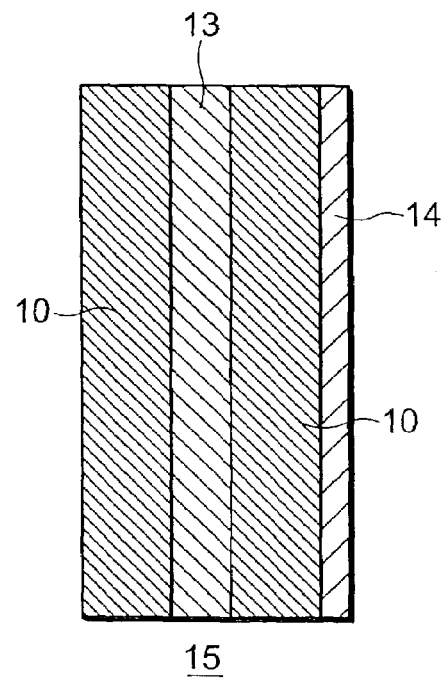
FIG. 2 is a sectional view for explaining a conventional fire-protection glass product having a laminated glass structure comprising a glass plate with a heat ray reflection film formed thereon.

Description will now be made of embodiments of this invention with reference to the drawing.

Figure 3A:
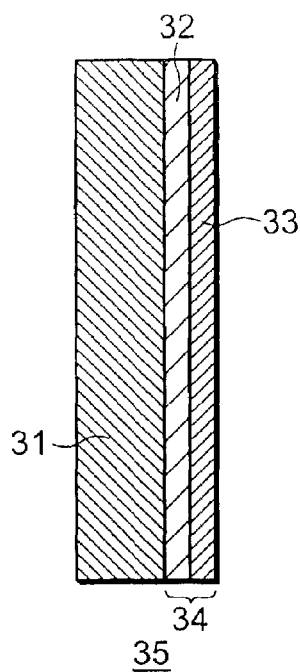
FIG. 3A is a sectional view for explaining a fire-protection glass product according to a first embodiment of this invention, in which a heat shielding film is formed on one of opposite surfaces of a glass plate and comprises a heat ray reflection film and an oxidation prevention film.

Referring to FIG. 3A, a fire-protection glass product 35 having a heat shielding characteristic according to an embodiment of this invention comprises a fireproof glass plate 31 and a heat shielding film 34 formed on one surface thereof. The heat shielding film 34 comprises a heat ray reflection film 32 and an oxidation prevention film 33.

Figure 3B:
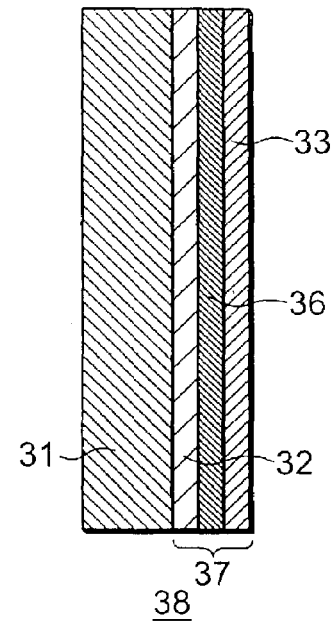
FIG. 3B is a sectional view for explaining a fire-protection glass product according to a second embodiment of this invention, in which a heat shielding film is formed on one of opposite surfaces of a glass plate and comprises a heat ray reflection film, an intermediate film, and an oxidation prevention film

Referring to FIG. 3B, a fire-protection glass product 38 comprises the fireproof glass plate 31 and a heat shielding film 37 formed on one surface thereof. The heat shielding film 37 comprises the heat ray reflection film 32, an intermediate film 36, and the oxidation prevention film 33.

Figure 4A:
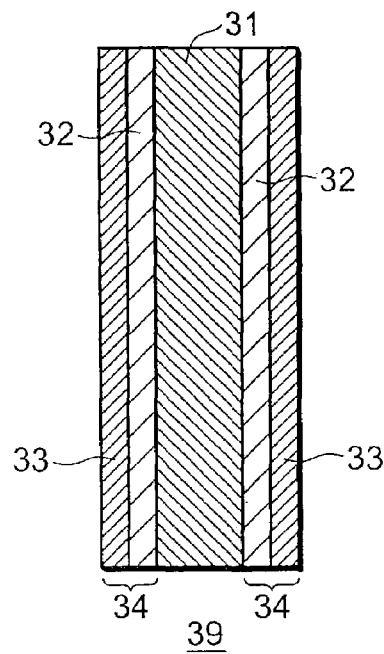
FIG. 4A is a sectional view for explaining a fire-protection glass product according to a third embodiment of this invention in which a heat shielding film is formed on each of opposite surfaces of a glass plate and comprises a heat ray reflection film and an oxidation prevention film.

Referring to FIG. 4A, a fire-protection glass product 39 comprises the fireproof glass plate 31 and a pair of the heat shielding films 34, similar to that illustrated in FIG. 3A, formed on both surfaces thereof, respectively.

Figure 4B:
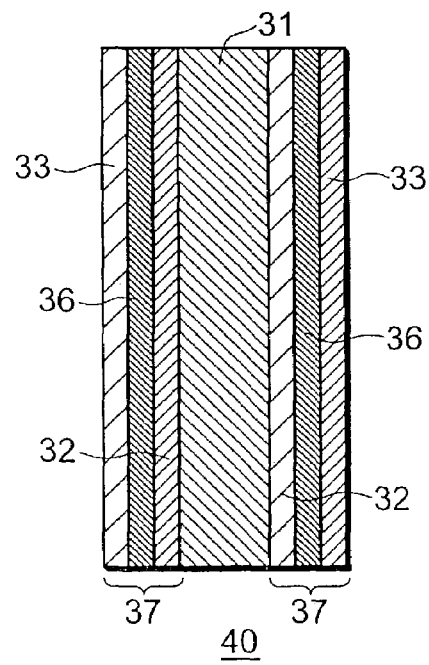
FIG. 4B is a sectional view for explaining a fire-protection glass product according to a fourth embodiment of this invention in which a heat shielding film is formed on each of opposite surfaces of a glass plate and comprises a heat ray reflection film, an intermediate film, and an oxidation prevention film.

Referring to FIG. 4B, a fire protection glass product 40 comprises the fireproof glass plate 31 and a pair of the heat shielding films 37, similar to that illustrated in FIG. 3B, formed on both surfaces thereof, respectively.

Each of the fire-protection glass products mentioned above has a fire-protection characteristic and a sufficient heat shielding characteristic and can be reduced in weight and in material cost. Moreover, even after heating, a high transmittance for visible rays can be maintained. Therefore, in a field requiring no safety characteristic, the fire-protection glass product is suitably usable.

Figure 5:
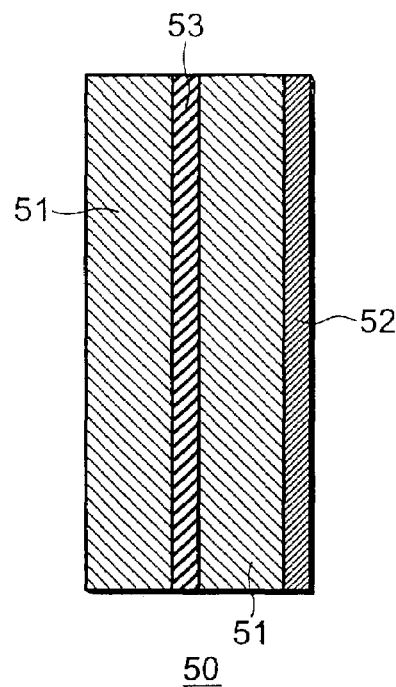
FIG. 5 is a sectional view for explaining a fire-protection glass product having a laminated glass structure according to a fifth embodiment of this invention.

Referring to FIG. 5, a fire-protection glass product 50 having a heat shielding characteristic according to this invention comprises two or more fireproof glass plates 51, a heat shielding film 52 formed on at least one surface thereof, and an intermediate resin layer 53 through which the fireproof glass plates 51 are laminated. With this structure, the safety characteristic can be obtained.

The intermediate resin layer 53 is preferably made of a colorless transparent fire-retardant resin, such as fluororesin, polycarbonate resin, and polyethylene terephthalate resin.

Figure 6:
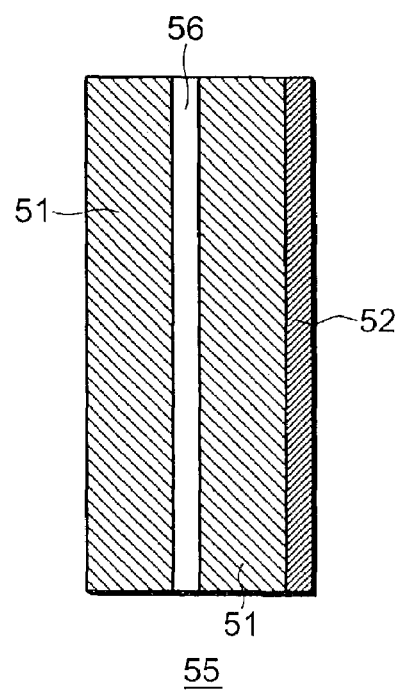
FIG. 6 is a sectional view for explaining a fire-protection glass product having a multilayer glass structure according to a sixth embodiment of this invention.

Referring to FIG. 6, a fire-protection glass product 50 having a heat shielding characteristic according to this invention comprises two or more fireproof glass plates 51, a heat shielding film 52 formed on at least one surface thereof, and an air layer 56 interposed therebetween. Such a structure is preferable because the heat shielding characteristic can further be improved. In case where the heat shielding film 52 is formed outside the fireproof glass plate 51 as illustrated in the figure, an excellent heat shielding characteristic can be obtained. If the heat shielding film 52 is formed adjacent to the air layer 56, the heat shielding film 52 is not readily damaged. Herein, it is to be noted that the above-mentioned heat shielding film 52 may be a double layered structure comprising the heat ray reflection film and the oxidation prevention film or a triple layered structure comprising the heat ray reflection film, the oxidation prevention film, and an intermediate film interposed therebetween.

In the fire-protection glass product having a heat shielding characteristic according to the this invention that, a heat gain is 1.0 W/cm$^2$ or less and an average transmittance for visible rays having a wavelength between 400 nm and 700 nm is 60% or more after one surface of the glass product is heated for 30 minutes in accordance with the ISO834 standard heat curve.

Under the above-mentioned condition, spontaneous ignition of combustibles due to the heat rays does not occur so as to suppress spread and expansion of fire. In addition, internal visibility can be secured so that the condition of fire can be monitored and lifesaving or fire fighting can be carried out. Herein, the heat gain means a heat quantity per unit area measured by a heat flow sensor which is vertically spaced at a distance of 1.0 m from the center of an unheated surface of the fireproof glass product. An ignition limit heat quantity of lumber is equal to 1.0 W/cm$^2$.

In the fire-protection glass product having a heat shielding characteristic according to this invention, it is advantageous that, after one surface of the glass product is heated for 60 minutes in accordance with the ISO834 standard heat curve, an average reflectance for infrared rays having a wavelength between 1500 nm and 2500 nm is 35% or more, preferably 50% or more, more preferably 60% or more, and an average transmittance for visible rays having a wavelength between 400 nm and 700 nm is 60% or more. Under the above-mentioned condition, the heat gain can be suppressed to 1.0 W/cm$^2$ or less and the average transmittance for visible rays having a wavelength between 400 nm and 700 nm can be kept at 60% or more after one surface of the glass product is heated for 30 minutes in accordance with the ISO834 standard heat curve.

Heat which propagates through the fire-protection glass product upon occurrence of fire includes heat transmitting via the fire-protection glass product as the heat rays and radiation heat emitted from the fire-protection glass product which is heated. The radiation heat is represented by the Stefan-Boltzman formula, i.e., $E=\epsilon\sigma T^4$ (E: radiation energy, $\epsilon$: radiation rate, $\sigma$: Stefan-Boltzman constant, T: absolute temperature). As is clear from this equation, the radiation energy (radiation heat quantity) from the fire-protection glass product is proportional to the fourth power of the absolute temperature. Therefore, the radiation heat quantity can be reduced if the temperature of a back surface (an unheated surface) is low. If the temperature of the fireproof glass plate elevates, the heat ray reflection film is deteriorated by heat so that the heat rays are easily transmitted.

Therefore, in the fire-protection glass product having a heat shielding characteristic according to this invention, it is preferable that the temperature of the back surface is 500° C. or less after one surface of the glass product is heated for 60 minutes in accordance with the ISO834 standard heat curve. Under the above-mentioned condition, the heat ray reflection film is not readily deteriorated so that the transmission of the heat rays can be avoided. As a consequence, the heat is not readily transmitted towards the next adjacent room and the spread and expansion of fire can be avoided.

In the fire-protection glass product having a heat shielding characteristic according to this invention, the heat shielding film comprising the heat ray reflection film and the oxidation prevention film or comprising the heat ray reflection film, the intermediate film, and the oxidation prevention film is formed on one surface of the fireproof glass plate. With this structure, multiple reflection of the heat rays hardly occurs inside the fireproof glass plate. Therefore, the heat rays are hardly adsorbed into the fireproof glass plate so that the temperature of the fire-protection glass product hardly elevates. Accordingly, the heat shielding film is not readily degraded by heat conduction, and the heat shielding characteristic is not easily lowered.

Preferably, the fire-protection glass product with at least the heat ray reflection film and the oxidation prevention film formed on one surface (which may be referred to as a film-deposited surface) of the fireproof glass plate is used in the manner such that the film-deposited surface of the glass product is placed outside of a protection area. In this event, the heat rays are reflected by the heat shielding film (i.e., a combination of at least the heat ray reflection film and the oxidation prevention film) and, therefore, the quantity of heat rays adsorbed into the fireproof glass plate is lowered in comparison with the case where the film-deposited surface is placed inside the protection area. Consequently, the temperature of the fireproof glass plate does not readily elevate and, therefore, deterioration of the heat shielding film can be avoided.

Specifically, the protection area includes an area concerned with human life, such as an escape route and a shelter, a computer room, or an area such as a library for keeping important books and documents. If the fire-protection glass product having a heat shielding characteristic according to this invention is used as a window member for the above-mentioned area in the manner such that the film-deposited surface of the glass product is located outside of the protection area, the safety of the escape route can easily be secured even upon occurrence of fire because it is superior in heat shielding characteristic. In addition, the spread and expansion of fire can be prevented so as to protect property.

TABLE 1

| | Examples | | | | | |
|---|---|---|---|---|---|---|
| | No. 1 | No. 2 | No. 3 | No. 4 | No. 5 | No. 6 |
| thickness of glass (mm) | 4 | 4 | 4 | 4 | 5 | 5 |
| film deposition | one surface | one surface | one surface | one surface | one surface | one surface |
| heat ray reflection film thickness (Å) | ITO 5000 | ITO 5000 | ITO 5000 | ITO 5000 | ITO 5000 | ITO 5000 |
| intermediate film thickness (Å) | — | — | — | — | $TiO_2$ 80 | $TiO_2$ 80 |
| oxidation prevention film thickness (Å) | $SiO_2$ 3000 | $SiO_2$ 1000 | $SiO_2$ 300 | $Si_3N_4$ 1000 | $SiO_2$ 1000 | $Si_3N_4$ 1000 |
| average transmittance for infrared rays (%) (1500–2500 nm) | | | | | | |
| before heating | 0 | 0 | 0 | 0 | — | — |
| 30 minutes after start of heating (A) | 1 | 2 | 7 | 5 | — | — |
| average reflectance for infrared rays (%) (1500–2500 nm) | | | | | | |
| before heating | — | — | — | — | 80 | 75 |
| 60 minutes after start of heating (B) | — | — | — | — | 75 | 72 |
| average transmittance for visible rays (%) (400–700 nm) | | | | | | |
| before heating | 78 | 80 | 75 | 75 | 77 | 73 |
| 30 minutes after start of heating (A) | 85 | 90 | 84 | 83 | — | — |
| 30 minutes after start of heating (B) | — | — | — | — | 79 | 74 |
| 60 minutes after start of heating (B) | — | — | — | — | 83 | 76 |
| back surface temperature (° C.) 60 minutes after start of heating (B) | — | — | — | — | 450 | 480 |
| heat gain (W/cm²) | | | | | | |
| 30 minutes after start of heating (B) | 0.4 | 0.4 | 0.8 | 0.4 | 0.4 | 0.6 |
| 60 minutes after start of heating (B) | 0.6 | 0.6 | 1.5 | 1.0 | 0.9 | 1.3 |
| film adhesion | — | — | — | — | ◎ | ◎ |

TABLE 2

| | Examples | | Comparative Examples | | | |
|---|---|---|---|---|---|---|
| | No. 7 | No. 8 | No. 9 | No. 10 | No. 11 | No. 12 |
| thickness of glass (mm) | 5 | 5 | 4 | 4 | 5 | 5 |
| film deposition | one surface | both surfaces | one surface | — | one surface | — |
| heat ray reflection film thickness (Å) | ITO 5000 | ITO 5000 | ITO 5000 | — | ITO 5000 | — |
| intermediate film thickness (Å) | — | $TiO_2$ 80 | — | — | — | — |
| oxidation prevention film thickness (Å) | $SiO_2$ 1000 | $SiO_2$ 1000 | — | — | — | — |
| average transmittance for infrared rays (%) (1500–2500 nm) | | | | | | |
| before heating | — | — | 0 | 90 | — | — |
| 30 minutes after start of heating (A) | — | — | 45 | 90 | — | — |
| average reflectance for infrared rays (%) (1500–2500 nm) | | | | | | |
| before heating | 85 | 80 | — | — | 90 | 7 |
| 60 minutes after start of heating (B) | 80 | 38 | — | — | 20 | 7 |
| average transmittance for visible rays (%) (400–700 nm) | | | | | | |
| before heating | 80 | 71 | 73 | 88 | 73 | 88 |
| 30 minutes after start of heating (A) | — | — | 88 | 88 | — | — |
| 30 minutes after start of heating (B) | 83 | 75 | — | — | 84 | 88 |
| 60 minutes after start of heating (B) | 90 | 84 | — | — | 88 | 88 |
| back surface temperature (° C.) 60 minutes after start of heating (B) | 430 | 615 | — | — | 580 | 650 |
| heat gain (W/cm$^2$) | | | | | | |
| 30 minutes after start of heating (B) | 0.4 | 0.4 | 1.7 | 2.0 | 1.8 | 2.4 |
| 60 minutes after start of heating (B) | 0.9 | 1.7 | 2.2 | 3.0 | 2.4 | 3.3 |
| film adhesion | ○ | ◎ | — | — | | |

EXAMPLES

Now, specific examples of the fire-protection glass product having a heat shielding characteristic according to this invention will be described in detail.

Table 1 shows examples (Samples Nos. 1–6) of this invention while Table 2 shows examples (Samples Nos. 7, 8) of this invention and comparative examples (Samples, Nos. 9–12).

The fire-protection glass products of Samples Nos. 1–12 were manufactured as follows.

By the use of a sputtering apparatus, those films shown in Tables 1 and 2 were deposited on $Li_2O$—$Al_2O_3$—$SiO_2$ based heat-resistant transparent crystallized glass plates (FIRELITE manufactured by Nippon Electric Glass Co., Ltd.) having a dimension of 900×600 mm and an average thermal expansion coefficient of $-5\times10^{-7}/°$ C. and having plate thickness shown in Tables.

For Samples Nos. 10 and 12 as the comparative examples, the heat-resistant transparent crystallized glass plates were used without any films deposited thereon.

For each sample before and after heating, measurement was made of spectral characteristics including an average reflectance for infrared rays or an average transmittance for infrared rays, and an average transmittance for visible rays by the use of a spectrophotometer. The average reflectance for the infrared rays having a wavelength between 1500 nm and 2500 nm was measured by the use of an integrating sphere. The average transmittance for the infrared rays having a wavelength between 1500 nm and 2500 nm and the average transmittance for the visible rays having a wavelength between 400 nm and 700 nm were measured without using the integrating sphere but were determined by a spectral curve thus obtained. Upon measuring the spectral characteristics, the film-deposited surface was arranged at the side of incident light.

In order to heat each sample, use was made of a heating method A and a heating method of B. Specifically, in the heating method A, each sample was introduced in an electric furnace kept at a temperature of 800° C. and heated for 30 minutes. In the heating method B, each sample was placed so that the film-deposited surface was faced to a gas heating chamber and thereafter heated for 30 or 60 minutes in accordance with the ISO834 standard heat curve.

A back surface temperature was measured by bringing a thermocouple into contact with the back surface (the unheated surface) of each sample heated for 60 minutes by the heating method B.

The heat shielding characteristic was evaluated in the following manner. Each sample was heated by the heating method B. By the use of a heat flow sensor which vertically spaced at a distance of 1.0 m from the center of the unheated surface of the sample, the heat gain after 30 or 60 minutes from the start of heating was measured. In this test, it is judged that, as the heat gain is smaller, the heat shielding characteristic is more excellent.

The film adhesion was evaluated in the following manner. Adhesion tapes were adhered to ten positions of the film-deposited surface of each sample, and then the adhesion tapes were peeled off. Observation was made of whether or not the film was peeled off or removed together with the adhesion tapes. In Tables, in case where the film was not removed at all, the sample is labelled ◎. In case where the film was removed at two or less positions, the sample is labelled ○. In case where the film was removed at three or more positions, the sample is labelled X.

As is obvious from Tables, with respect to Samples Nos. 1–4 as the examples of this invention, the average transmittance for the infrared rays having a wavelength between 1500 nm and 2500 nm was 7% or less after heating for 30 minutes by the heating method A. As a result, the heat gain was as low as 0.8 W/cm$^2$ or less after 30 minutes from the start of heating and 1.5 W/cm$^2$ or less after 60 minutes from the start of heating.

In particular, with respect to Samples Nos. 1, 2, and 4 in which the oxidation prevention film has a film thickness of 1000 Å or more, the average transmittance for the infrared rays having a wavelength between 1500 nm and 2500 nm was 5% or less after heating. In each of these Samples, the heat gain was equal to 0.4 W/cm$^2$ after 30 minutes from the start of heating and 0.6–1.0 W/cm$^2$ after 60 minutes from the start of heating. Thus, very excellent results were obtained.

Further, the average transmittance for the visible rays having a wavelength between 400 nm and 700 nm was 75% or more before heating and 83% or more after heating for 30 minutes by the heating method A.

With respect to Samples Nos. 5–8 as the examples of this invention, the average reflectance for the infrared rays having a wavelength between 1500 nm and 2500 nm was 35% or more even after heating 60 minutes by the heating method B and, in particular, 72% or more in Samples 5–7 in which the films were deposited only on one surface. As a consequence, the heat gain was 0.6 W/cm$^2$ or less after 30 minutes from the start of heating and 1.7 W/cm$^2$ or less after 60 minutes from the start of heating. Particularly, Samples 7 and 9 had the heat gain of 0.9 W/cm$^2$ or less and were superior in heat shielding characteristic.

With respect to Samples Nos. 5–8, the back surface temperature was lower than that in Sample No.12 without the heat ray reflection film. In particular, Samples Nos. 5–7 exhibited excellent results, i.e, the back surface temperature of 480° C. or less.

Moreover, the average transmittance for the visible rays having a wavelength between 400 nm and 700 nm was also excellent, i.e., 71% or more before heating and 76% or more after heating.

The film adhesion of Samples Nos. 5–8 was excellent.

On the other hand, with respect to Samples No. 9 and 11 as the comparative examples, the average transmittance for the infrared rays having a wavelength between 1500 nm and 2500 nm was 45% or more after heating for 30 minutes by the heating method A. Therefore, the heat gain was 1.7 W/cm$^2$ or more after 30 minutes from the start of heating and 2.2 W/cm$^2$ or more after 60 minutes from the start of heating. Thus, the heat shielding characteristic was low.

With respect to Samples Nos. 11 and 12 as the comparative examples, the average reflectance for the infrared rays having a wavelength between 1500 nm and 2500 nm was 20% or less after heating for 60 minutes by the heating method B. Therefore, the back surface temperature was as high as 580° C. or more and the heat gain was 1.8 W/cm$^2$ or more after 30 minutes from the start of heating and 2.4 W/cm$^2$ or more after 60 minutes from the start of heating. Thus, the heat shielding characteristic was low.

In the fire-protection glass product having a heat shielding characteristic according to this invention, the oxidation prevention film prevents the heat ray reflection film from being oxidized under the high temperature. Consequently, the heat ray reflection film can reflect the heat rays during a long time upon occurrence of fire so that the heat shielding characteristic can be maintained. Therefore, the spread of expansion of fire towards the next adjacent room can be avoided so that the safe escape route can be secured during a long time. Further, the fire-protection glass product is transparent even upon occurrence of fire. Therefore, the condition of fire can be monitored, and the lifesaving and the fire fighting can readily be carried out. Moreover, the fire-protection glass product is light in weight so as to be easily installed, and low in material cost. Therefore, the fire-protection glass product is suitable for use as the window member for the escape route, the shelter, the computer room, or the like.

While this invention has thus far been disclosed in conjunction with several embodiments thereof, it will be readily possible for those skilled in the art to put this invention into practice in various other manners.

What is claimed is:

1. A fire-protection glass product having a heat shielding characteristic, comprising:
   single fireproof glass plate without a resin layer;
   heat ray reflection film which is formed on at least one of opposite surfaces of the fireproof glass plate and which is made from indium tin oxide; and
   an oxidation prevention film which is formed on the heat ray reflection film, the oxidation prevention film having a film thickness between 100 Å and 5000 Å.

2. A fire-protection glass product as claimed in claim 1, wherein:
   an average reflectance for infrared rays having a wavelength between 1500 nm and 2500 nm is 70% or more while an average transmittance for visible rays having a wavelength between 400 nm and 700 nm is 60% or more.

3. A fire-protection glass product as claimed in claim 1 wherein:
   the fireproof glass plate is made of a heat-resistant transparent crystallized glass having a thermal expansion coefficient between $-10 \times 10^{-7}/°$ C. and $+20 \times 10^{-7}/°$ C.

4. A fire-protection glass product as claimed in claim 1, wherein:
   the heat ray reflection film has a film thickness between 1000 Å and 15000 Å.

5. A fire-protection glass product as claimed in claim 1, wherein:
   the oxidation prevention film is made of a material selected from the group consisting of silicon oxide, silicon nitride, aluminum oxide, and tin oxide.

6. A fire-protection glass product as claimed in claim 1, wherein:
   an intermediate film is formed between the heat ray reflection film and the oxidation prevention film.

7. A fire-protection glass product as claimed in claim 6, wherein:
   the intermediate film is made of a material selected from the group consisting of titanium oxide, zirconium oxide, and aluminum oxide.

8. A fire-protection glass product as claimed in claim 6, wherein:
   the intermediate film has a film thickness between 20 Å and 200 Å.

9. A fire-protection glass product having a heat shielding characteristic, and comprising a single fireproof plate of glass wherein:
   heat gain is 1.0 W/cm$^2$ or less, after one surface of the glass products is heated for 30 minutes in accordance with an ISO834 standard heat curve and
   an average transmittance for visible rays having a wavelength between 400 nm and 700 nm is 60% or more after one surface of the glass product is heated for 30 minutes in accordance with ISO834 standard heat curve.

10. A fire-protection glass product as claimed in claim 9, wherein:
    an average reflectance for infrared rays having a wavelength between 1500 nm and 2500 nm is 35% r more after one surface of the glass product is heated for 60 minutes in accordance with the ISO834 standard heat curve,; and
    an average transmittance for visible rays having a wavelength between 400 nm and 700 nm is 60% or more, after one surface of the glass product is heated for 60 minutes in accordance with the ISO834 standard heat curve.

11. A fire-protection glass product having a heat shielding characteristic, and comprising a single fireproof plate of glass, wherein:
    after the glass product is heated for 30 minutes at 800° C., an average transmittance for infrared rays having a wavelength between 1500 nm and 2500 nm is 10% or less after the glass product is heated for 30 minutes at 800° C.; and
    an average transmittance for visible rays having a wavelength between 400 nm and 700 nm is 60% or more after the glass product is heated for 30 minutes at 800° C.

* * * * *

UNITED STATES PATENT AND TRADEMARK OFFICE
CERTIFICATE OF CORRECTION

| | | |
|---|---|---|
| PATENT NO. | : 7,083,857 B2 | Page 1 of 1 |
| APPLICATION NO. | : 10/371818 | |
| DATED | : August 1, 2006 | |
| INVENTOR(S) | : Sawada et al. | |

It is certified that error appears in the above-identified patent and that said Letters Patent is hereby corrected as shown below:

In particular, in Column 12, line 17 (Line 4 of Claim 1) before the word "single" please insert: --a--.

In Column 12, line 18 (Line 4 of Claim 1) before the word "heat" please insert: --a--.

In Column 12, line 61 (Line 4 of Claim 9) before the word "heat" please insert: --a--.

In Column 13, line 7 (Line 4 of Claim 10) after "35%" please change "r" to correctly read: --or--.

Signed and Sealed this

Third Day of April, 2007

JON W. DUDAS
*Director of the United States Patent and Trademark Office*